(12) United States Patent
Demeniuk

(10) Patent No.: US 6,579,167 B1
(45) Date of Patent: Jun. 17, 2003

(54) PIVOT SLIDE DOOR FOR VENTILATING SYSTEM

(75) Inventor: Lawrence Paul Demeniuk, Sterling Heights, MI (US)

(73) Assignee: Valeo Climate Control, Corp., Auburn Hills, MI (US)

( * ) Notice: Subject to any disclaimer, the term of this patent is extended or adjusted under 35 U.S.C. 154(b) by 0 days.

(21) Appl. No.: 10/073,127

(22) Filed: Feb. 13, 2002

(51) Int. Cl.[7] .................................................. B60S 1/54
(52) U.S. Cl. ........................... 454/126; 165/41; 454/121
(58) Field of Search ................................. 454/156, 121, 454/126; 237/12.3 R, 12.3 B; 165/41, 42

(56) References Cited

U.S. PATENT DOCUMENTS

| | | | |
|---|---|---|---|
| 4,614,152 A | * | 9/1986 | Fukasaku et al. ......... 137/625.4 |
| 5,162,020 A | * | 11/1992 | Asano et al. ................. 165/103 |
| 5,551,667 A | * | 9/1996 | Galka et al. .................. 251/212 |
| 5,701,949 A | * | 12/1997 | Yamaguchi et al. ........ 137/872 |
| 5,881,558 A | * | 3/1999 | Kawahara et al. .......... 454/156 |
| 6,347,988 B1 | * | 2/2002 | Kurokawa et al. ............. 165/42 |
| 6,450,246 B1 | * | 9/2002 | Kurokawa et al. ............. 165/42 |

FOREIGN PATENT DOCUMENTS

DE            196 40 371 A1     4/1997

* cited by examiner

Primary Examiner—Derek S. Boles
(74) Attorney, Agent, or Firm—Liniak, Berenato & White

(57) ABSTRACT

A door and housing assembly for controlling air flow through the housing. The housing is adapted to be mounted in a ventilating system for controlling the direction and flow of air passing through the system. The door is actuated to move between two end positions where the respective air pathways are each sealed. The door can be positioned at any location between the end positions to control air flowing to the respective air pathways. The door includes guide pins on edges thereof that move along slots located in the inner sidewalls of the housing and guide the door between its end positions to locate the door in selected intermediate positions thereof. The slots for guiding the door may be steeply angled with respect to the seals so as to create minimal wiping of the respective seals upon engagement and disengagement between the door and seals at end positions of door travel.

7 Claims, 7 Drawing Sheets

PIVOT SLIDE DOOR FOR VENTILATING SYSTEM

BACKGROUND OF THE INVENTION

The present invention relates to the field of directing ventilating air in a ventilating system. More specifically, the present invention relates to a pivot slide door mechanism for directing air through one or another of two selected air pathways in a ventilating system.

DESCRIPTION OF THE PRIOR ART

In automotive ventilating systems and in ventilating systems generally there exists a need to direct air as desired through respective air pathways. The air can be directed by dampers, doors, and various mechanisms to where ever it is the ventilating system designer would like the air to proceed under any selected design condition. For example, in a vehicle it is sometimes the desire to recirculate air within the vehicle as opposed to drawing fresh in from outside of the vehicle compartment. To accomplish this system requirement a recirc housing is provided that includes a door mechanism for selectively enabling fresh air into the vehicle or prohibiting this from occurring. Likewise, a design requirement may be to pass air through the air conditioning evaporator but not through the heater core. To accomplish this directing of ventilating air typically requires a so called "temperature door" which may be combined with one or more doors to be built into the ventilating system depending on packaging and component restrictions as well as air path requirements.

Whenever a ventilating system adds functional characteristics, added hardware and controls for the hardware necessarily follows. Along with the added tooling comes added complexity and interaction of respective operations and, owing to the foregoing factors, an increase in the likelihood of total or partial system failure. In addition, particularly in vehicle mounted systems, physical spacing between the mechanism and their control elements becomes increasingly a consideration as limited space becomes even more so.

The prior art has many complex devices for directing air in automobile mounted HVAC systems. However, the complexity only adds cost to the design process, adds cost to the manufacture, and further constrains space behind the vehicle dash.

SUMMARY OF THE INVENTION

In view of the drawbacks and disadvantages identified in the prior art, it is an object of this invention to provide a simpler and more reliable mechanism for directing air selectively in air pathways of a ventilating system. The mechanism includes a single door for controlling airflow between two separate pathways. The door is mounted so as to pivot and slide simultaneously between two positions at respective end positions of its movement. At each end position, one or the other of the air pathways is totally blocked and, in positions between the respective end positions, air can be directed to either air pathway in any desired combination.

This single slide door mechanism can be incorporated into a ventilating system at any or multiple locations therein where selective directing of air between two paths is necessary. For example, the pivot slide door of the present invention may be used as a recirculating air control door for selectively choosing to recirculate air, select fresh air, or any combination in between. In another example, the door of the present invention may be used to select air pathways directing ventilating air either through the heater core or through the A/C evaporator. In another example, the door of the present invention may be used in plural form so as to provide separate temperature selections for different locations along the ventilating system.

DETAILED DESCRIPTION OF THE PREFERRED EMBODIMENT

Figure 1A:
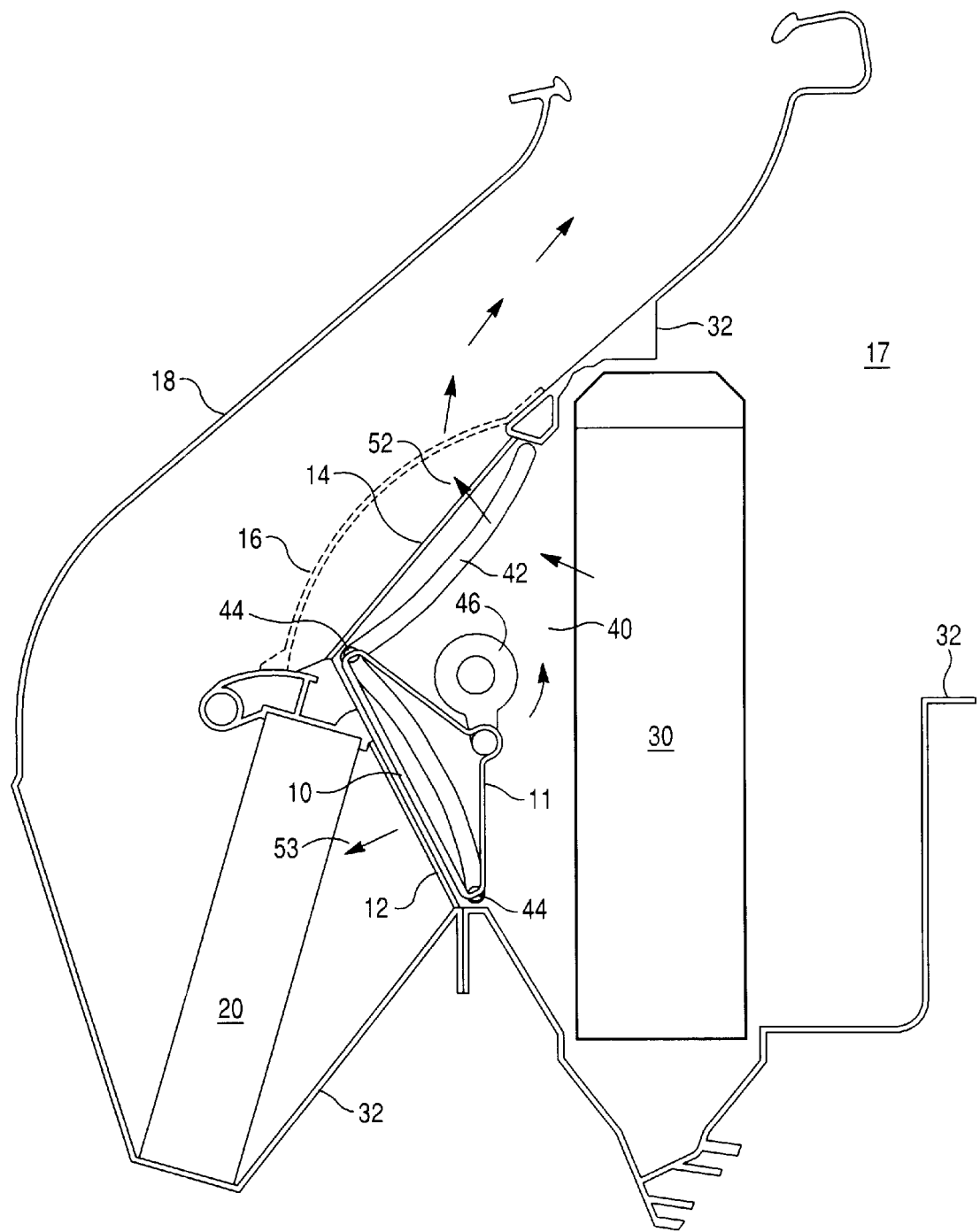
FIG. 1A–E show a sequence of operation of a pivot slide door system according to the present invention.
Figure 1B:
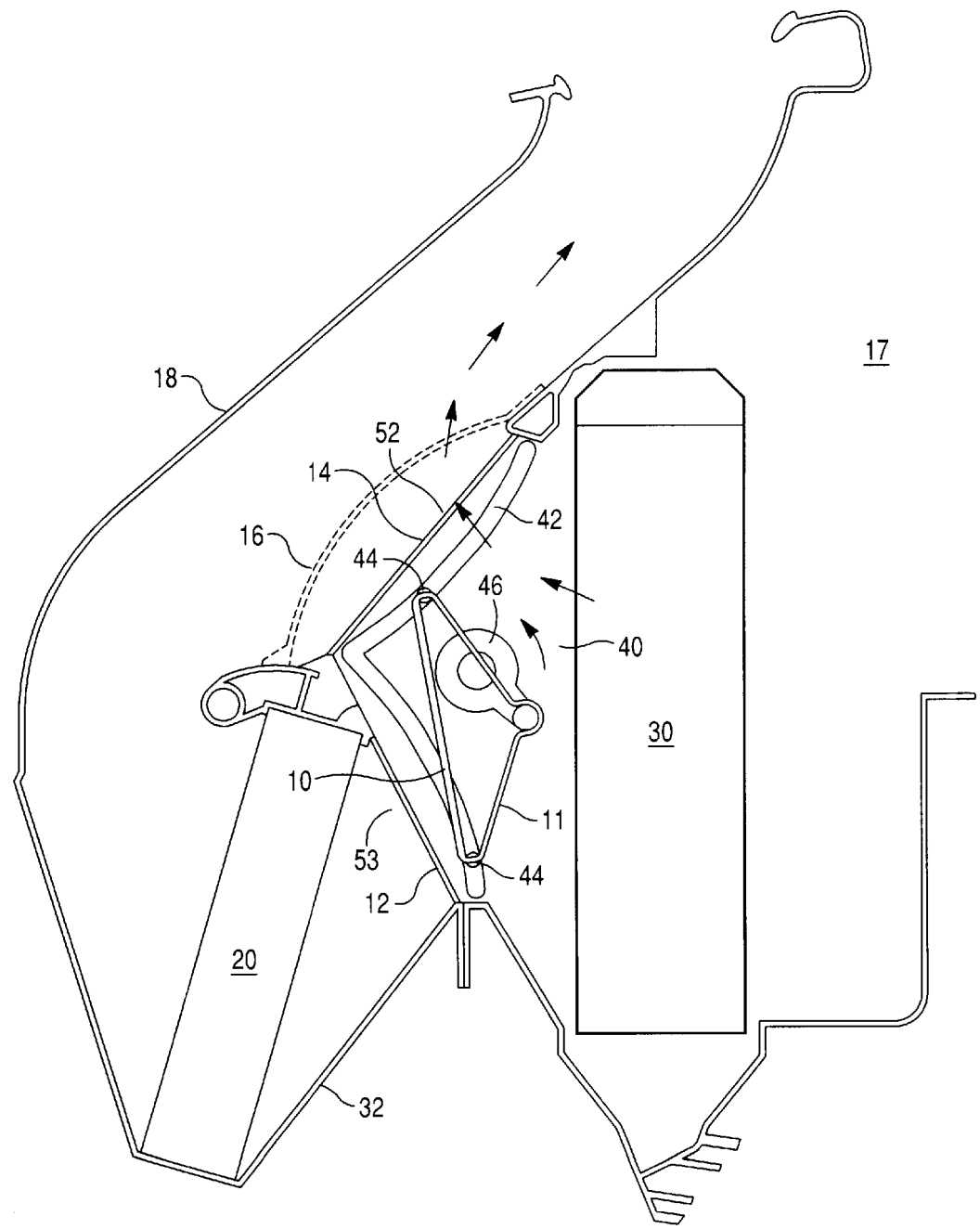

A pivot door system is shown according to the present invention in FIG. 1A. The pivot door is shown in partial section installed as a combination hot and cold door regulator for a vehicle ventilating system. The ventilating system includes an air source volume 17 that provides air to pass through the pivot door 10 on to an upwind air pathway 18. In this system an A/C evaporator is shown 30, as a contact source for reducing the temperature and humidity of passing air, and a heater core 20, as a contact source for increasing the temperature of the passing air. In this system, air can pass either through the A/C evaporator 30 and then directly to the upwind air pathway 18 through the air pathway 52 defined by the cold air plane seal 14, or it can also pass through pathway 53 defined by the hot air seal plane 12. The position and movement of the pivot door 10 enable the control for directing the passing air through the respective hot or cold air plane seals.

Figure 1C:
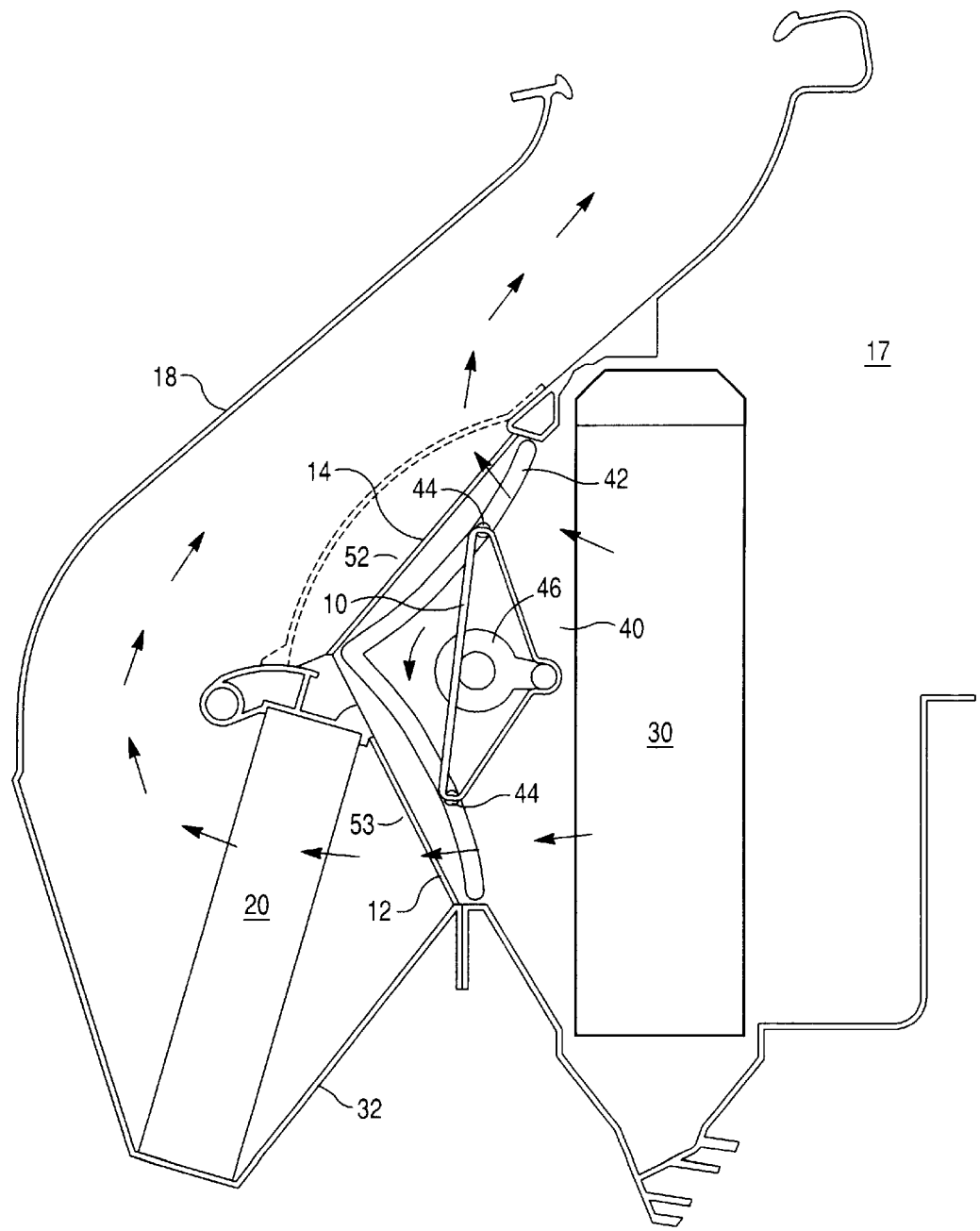
Figure 1D:
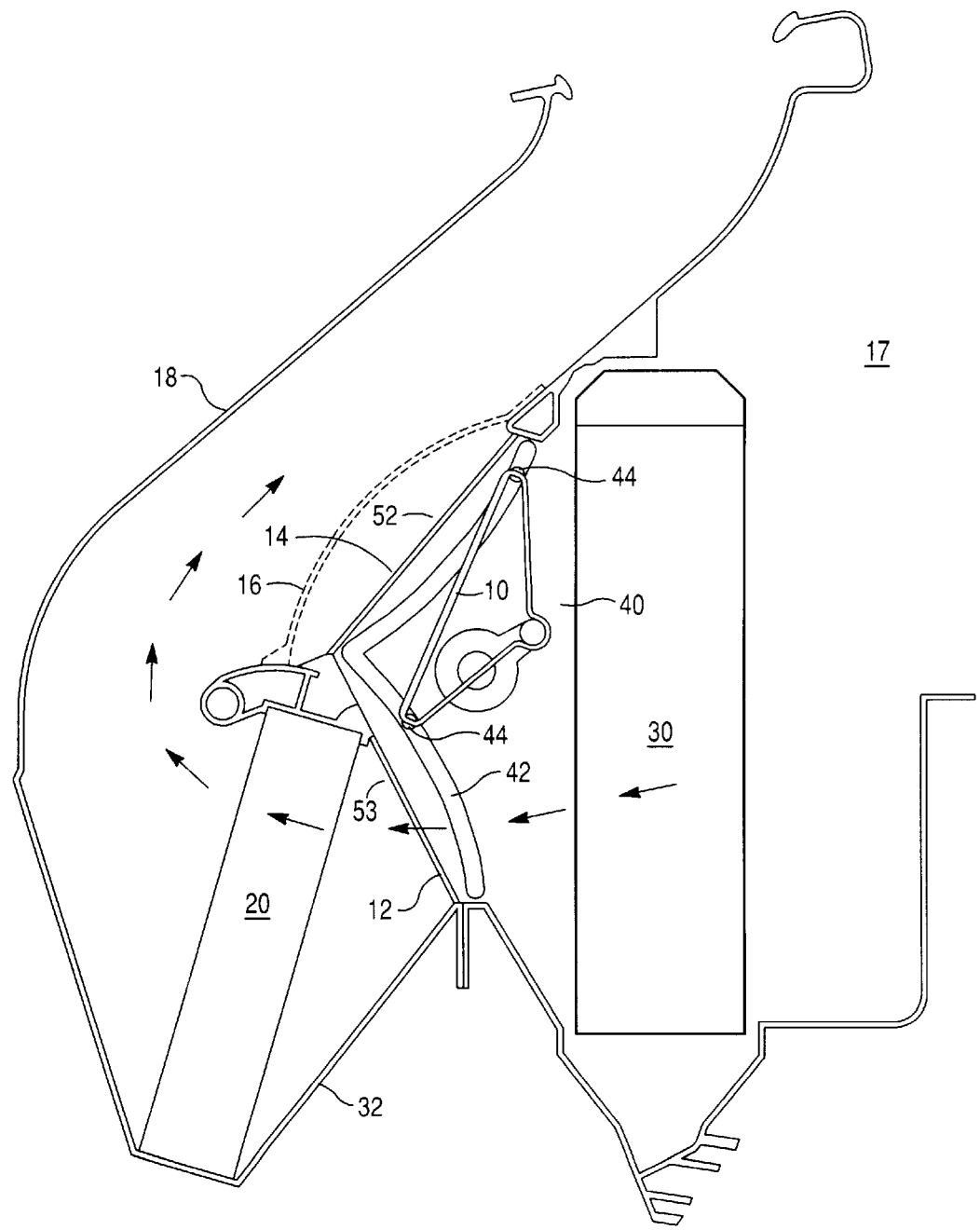
Figure 1E:
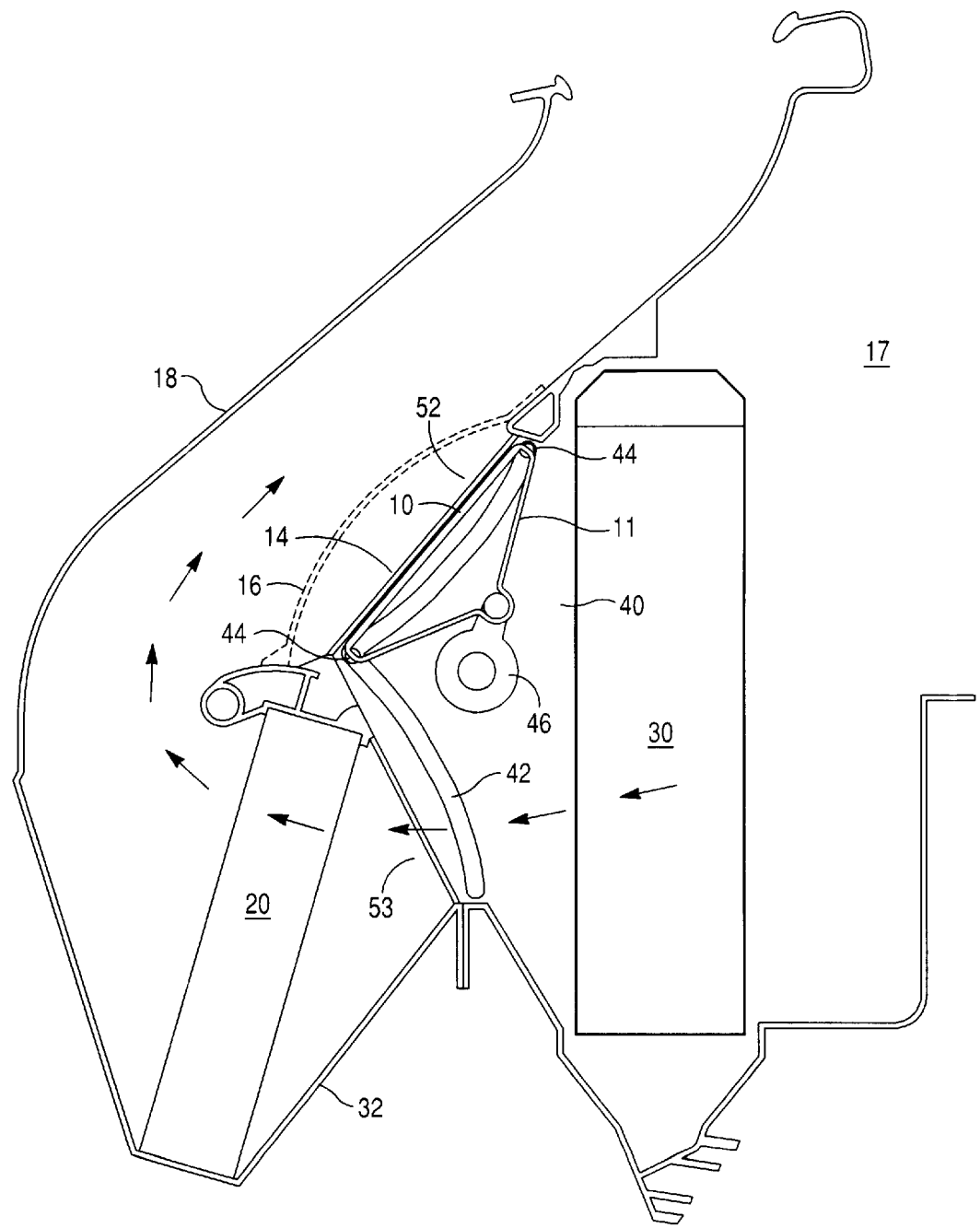

As shown in sequence in FIGS. 1A–1E, the pivot door 10 can assume a plurality of positions between the respective end positions of pivot door 10 travel shown in FIGS. 1A and 1E. In any selected position, air is directed in a predetermined proportion through the hot or cold air plane seal defined air pathways 52 and 53. As air passes through both defined pathways 52 and 53, as shown in FIG. 1C, the air is mixed in the upwind air pathway by the action of baffle 16 dividing air passing through the cold air plane seal into smaller mixing and eddy currents as it recombines with the air passing through the hot air plane seal. According to this operation, the single pivot door 10, and associated single actuating mechanism 40, of the present invention controls air passing through separate air pathways. Whereas prior art systems with similar design packaging space restrictions commonly have two or more separately actuated doors performing this task, the present invention has a single door.

The pivot door 10 is shown installed so as to control the hot/cold air control of a specific ventilating system, however the door and actuating mechanism can be used, for example, to control air passing to distinct upwind air pathways (not rejoining as shown). In addition, more than one of the shown pivot doors may be included so as to provide local environment control on a seat by seat or compartment by compartment basis in a vehicle or other controlled ventilation system. The advantages of a single door and controller therefore become readily apparent from both cost and simplicity perspectives.

Figure 2:
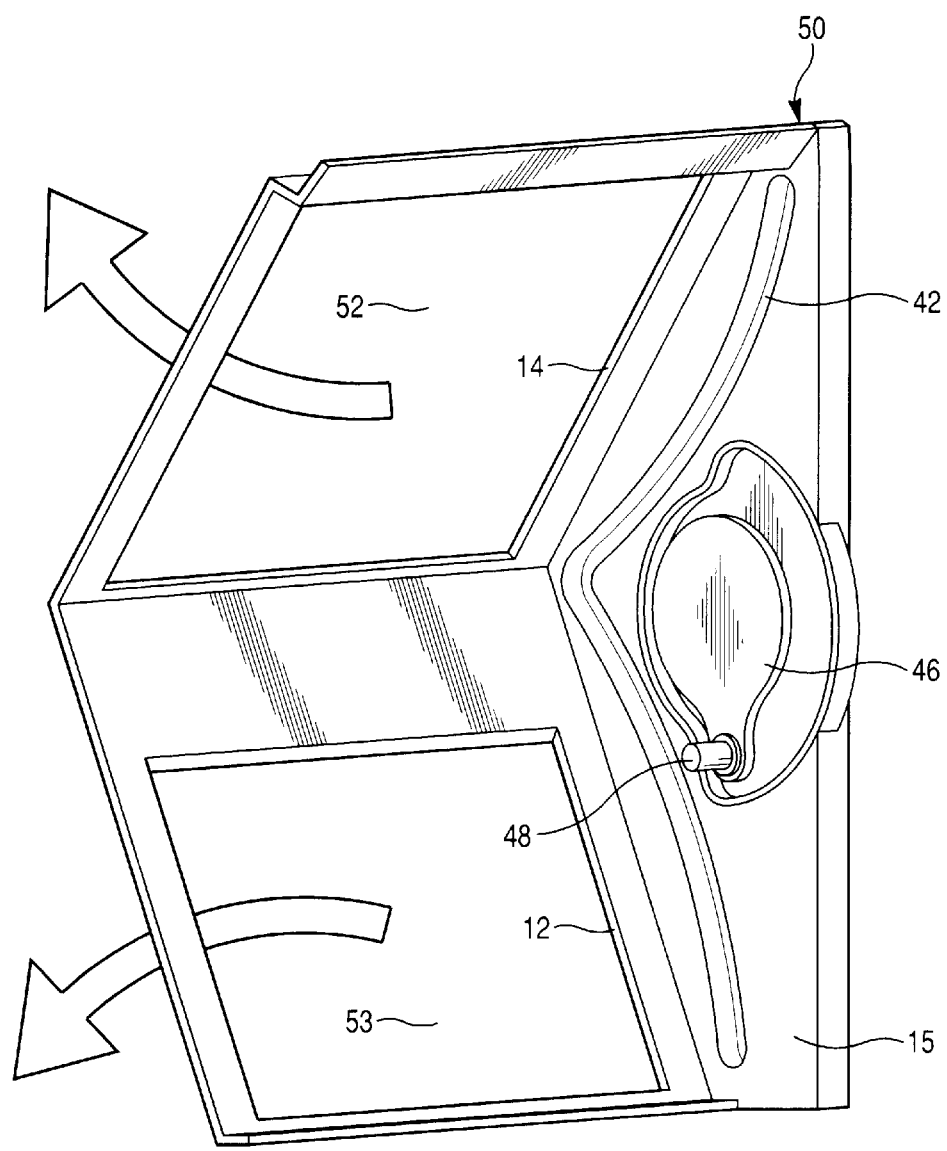
FIG. 2 shows a pivot door housing and sealing frames according to the present invention.
Figure 3:
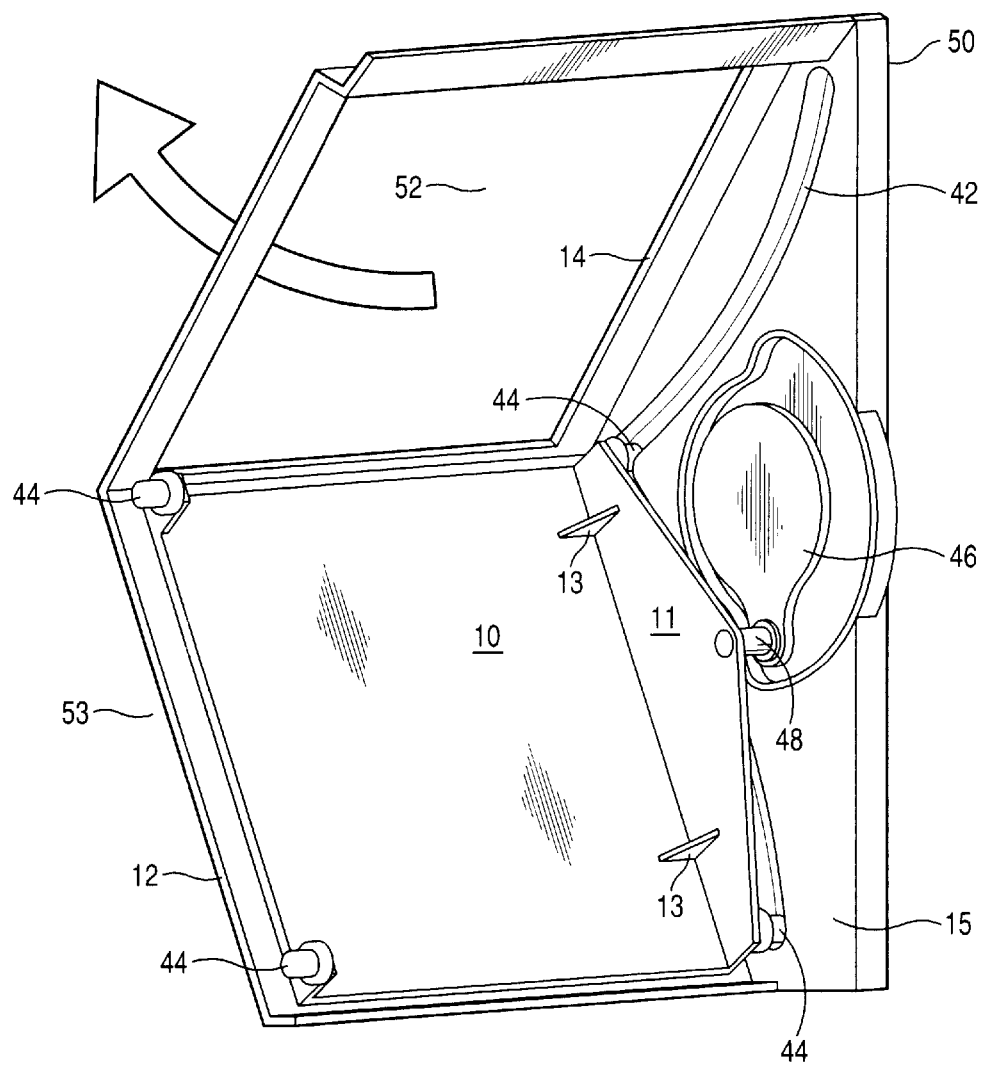
FIG. 3 shows a pivot door housing and sealing frames with a pivot door in an end position of travel.

FIGS. 2 and 3 show a typical housing 50 for the pivot door 10 as described heretofore with reference to FIGS. 1A–E.

The pivot door 10 uses a side element 11 that attaches the door 10 for purposes of actuation to a lever mounted pin. This connection between the door 10 and side element 11 may be reinforced as necessary or as the scale and actuating requirements of the door change for specified installations and require a stiffer connection there between. The reinforcement may comprise an additional web 13 or brace extending between the door 10 and side element 11. The pin 48 is, in turn, mounted for cooperating actuation by a rotating actuation lever 46. The lever 46 is connected to, for example, a rotating actuator either directly or through a cable connector or electronic actuator (not shown) that is operated by a person desiring to control the flow and mix of air regulated by the door 10.

The housing 50 is shown in FIGS. 2 and 3 from the perspective of the approaching air after it has passed through the A/C evaporator shown in FIGS. FIGS. 1–E. The housing is in the form of a pyramidal shape extending into the page from the viewer's perspective. (The shape can differ according to design and spacing requirements.) As shown, the upper air pathway 52 is defined by the cold air seal plane surround 14 and the lower air pathway 53 is defined by the hot air seal plane surround 12. These respective seals 12 and 14 form the seal surfaces which interface with the door 10, and are molded to side elements 15 (that may comprise the case or housing of the HVAC unit) (only one side element 15 is shown in FIGS. 2 and 3) of the housing 50. The side elements 15 of housing 50 include opposed guide slots or tracks 42 that face inwardly and interact with door 10 mounted guide pins 44 as shown in FIG. 3. As the lever is rotated counter-clockwise from its first end position shown in FIG. 3 (corresponding to the position also shown in FIG. 1A), the door 10 releases, with minimal seal wiping, from its sealing engagement with hot air seal plane 12 and begins its slot 42 guided migration, as shown in sequence in FIGS. 1B–1E, to a second end position, shown in FIG. 1E, where door 10 seals, again with minimal seal wiping, against cold air seal plane 14. For intermediate positions of the door 10, an operator-controlling lever 46, rotating through an approximately full 0–160 degree range, can accomplish any desired flow of air through the respective pathways 52 and 53.

The particular configuration of the door 10, housing 50, and surrounding underdash structure 32 is for purposes of illustration only. The present invention of a slot and pin guided single pivot door for controlling air passing to separate air pathways is readily applicable to a variety of ventilating system configurations and design parameters especially where space and cost constraints are at issue. In this specific application, the single door and guide slots accommodate the close spacing between the A/C evaporator 30, heater core 20, and proximate upwind air pathway 18. The shape of the door 10, its edge shape, the seal shapes 12 and 14, and the specified paths of the opposed guide slots 42 may be different according to various ventilating system requirements. For example, for even less seal wiping than shown in the drawings, the end portions of slots 42 may be even more steeply angled towards the respective seals 12 and 14 thereby reducing seal wiping and enhancing direct compression of the seals during engagement of the door 10.

The door 10, housing 50, and associated actuation mechanism 40 are made from materials useful for ventilating systems and include light metal and plastics and state-of-the-art combinations thereof. In addition, the reference seal planes 12 and 14 are usefully sealed with foam or thermoplastic elastomer seals on either the door or the seal frames or both to effect a sufficiently air tight fit between the door and the respective air pathways 52 and 53. The door system of the present invention is attached under dash, or in any necessary relation, to the air pathway for which control of the air is desired. The attachment to secure the system can include additional brackets, bracing, and direct screw, rivet, glue, or other fastener connection to a vehicle component or HVAC tract element.

What is claimed is:

1. A door and actuator assembly for a ventilating system, comprising:

a housing having two air pathways passing therefrom, and a pair of seal surfaces defining the respective air pathways as the pathways exit said housing; and, a door adapted for sealing engagement with either of said seal surfaces when said door is located in a first end position thereof, said door arcuately guided to a second end position in engagement with the other of said seal surfaces by a pair of slots located on opposed side elements of said housing, said slots cooperating with pin guide members mounted on said door for arcuately guiding said door from said first end position to said second end position upon said door being acted upon by actuating means, wherein said actuating means is positioned upstream of said two air pathways with respect to said door.

2. An assembly as in claim 1, further comprising:

mounting means for attaching said housing to a ventilating system support structure.

3. An assembly as in claim 1, wherein:

said actuating means comprised of a door side element respectively pivotally connected to a pin rotating element, said pin rotating element cooperating with a lever means for rotating said pin and urging said door along an arcuate path defined by said slots.

4. An assembly as in claim 3, wherein:

said lever means rotates through a range of from 0–160 degrees of movement.

5. An assembly as in claim 3, wherein:

said actuating means further comprises a reinforcing element for reinforcing a connection between said door and said side elements.

6. An assembly as in claim 1, wherein:

said seals comprise plane seals.

7. An assembly as in claim 1, wherein:

said slots are angled steeply with respect to said seals to create minimal seal wiping as said door engages said seals at said first and second end positions.

* * * * *